March 14, 1961  J. DOLZA  2,974,541
OFFSET PISTON-PIN BALANCING ARRANGEMENT FOR ENGINES
Filed Sept. 7, 1954  3 Sheets-Sheet 1

INVENTOR
John Dolza
BY
L.D. Burch
ATTORNEY

INVENTOR
John Dolza
BY L. D. Burch
ATTORNEY

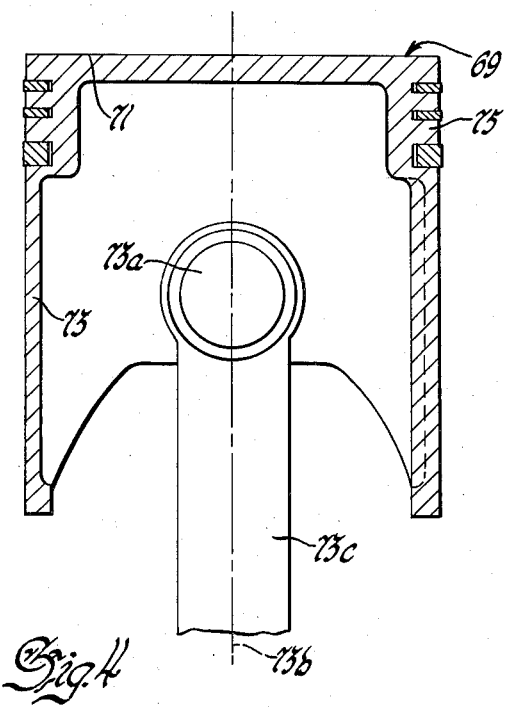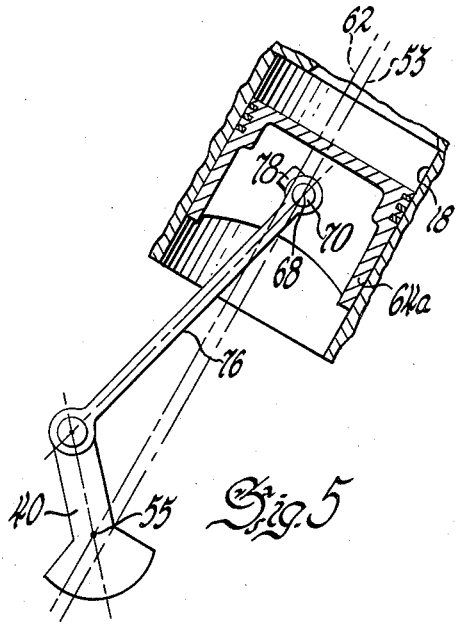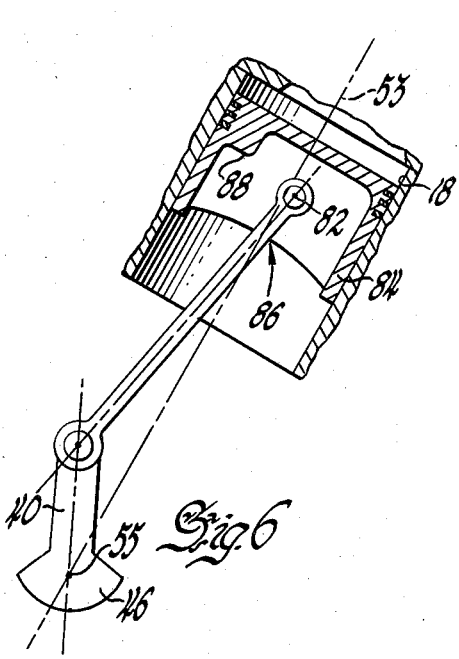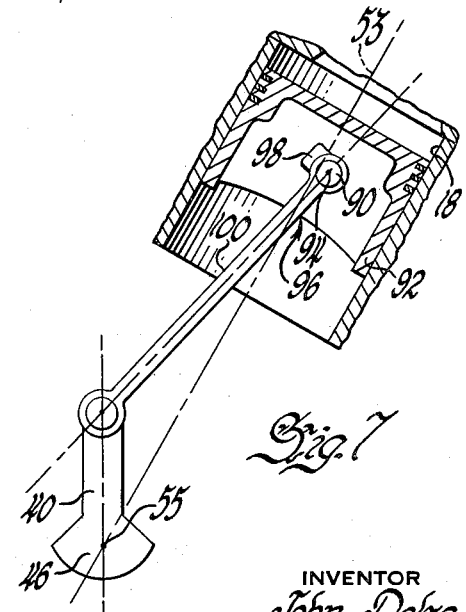

United States Patent Office 2,974,541
Patented Mar. 14, 1961

2,974,541

OFFSET PISTON-PIN BALANCING ARRANGEMENT FOR ENGINES

John Dolza, Davisburg, Mich., assignor to General Motors Corporation, Detroit, Mich., a corporation of Delaware Filed Sept. 7, 1954, Ser. No. 454,370

12 Claims. (Cl. 74—579)

The present invention relates to reciprocating engines more particularly to the piston and connecting rod assembly therefor.

In an engine having a piston reciprocably disposed in a cylinder extending through the engine cylinder block, the piston is normally connected to a rotating crankshaft by means of a connecting rod. One end of this connecting rod is journaled on a throw projecting from the crankshaft and accordingly, it travels in a circle. The other end of the rod is connected to a wrist pin disposed inside of the piston and accordingly, reciprocates along a straight line. It may thus be seen that the connecting rod is not always parallel to the axis of the cylinder and it will tend to produce a side thrust on the piston which will force the piston against one of the side walls of the cylinder. When the piston and cylinder are symmetrical about a plane containing the crankshaft, at some point the angularity of the connecting rod will reverse itself and force the piston to move, apparently in translation, from one side of the cylinder to the other. Since there is of necessity a working clearance between the piston and cylinder and the forces on the piston are quite large, the movement of the piston may be quite violent and cause so-called "piston slap." In order to alleviate or reduce the effects of this movement, it has been the practice to laterally offset the axis of the cylinder so that it does not intersect the axis of rotation of the crankshaft and/or to laterally offset the axis of the wrist pin from the axis of the cylinder. Under these circumstances when the piston moves from one side of the cylinder to the other, it apparently moves as a result of rotation and translation rather than purely translation. As a result, the movement is slower and occurs over a longer arc of rotation of the crankshaft and the piston may strike the cylinder wall in such a manner that an oil wedge film may be formed that provides better lubrication. Although this offsetting of the axis of the cylinder and/or the wrist pin reduces the detrimental effects of piston slap, it places the effective center of mass of the reciprocating piston and connecting rod assembly so that it travels along an axis that does not pass through the axis of rotation of the crankshaft. This tends to create vibrations in the engine. Since any counterweights on the crankshaft will rotate about an axis that does not intersect the axis along which the masses reciprocate, these vibrations are extremely difficult, if not impossible, to balance by means of counterweights located on the crankshaft.

It is now proposed to provide means for laterally offsetting the axis of the cylinder from the axis of rotation of the crankshaft and/or the axis of the wrist pin from the cylinder axis so as to reduce the detrimental effects of piston slap without producing any unbalanced forces. This may be accomplished by causing the effective center of mass of the piston and connecting rod assembly to reciprocating along an axis extending through the axis of rotation of the crankshaft. Although there are numerous ways in which this may be accomplished, it is proposed to provide an eccentrically disposed mass on the inside of the piston and/or the connecting rod. This mass is preferably of such magnitude and disposition as to place the resultant reciprocating center of mass of the piston and connecting rod assembly so that it will travel along an axis that extends through the axis of rotation of the crankshaft. As a result all of the forces will be acting through the axis of the crankshaft and it will be possible to balance out all of the unbalanced forces by means of counter-balance weights on the crankshaft.

In the drawings:

Fig. 4 is a cross sectional view of a piston which is a modification of the piston in Fig. 2.

Fig. 5 is a diagrammatic representation of one form of the present invention.

Fig. 6 is a diagrammatic representation of another form of the present invention.

Fig. 7 is a diagrammatic representation of another form of the present invention.

Figure 1:
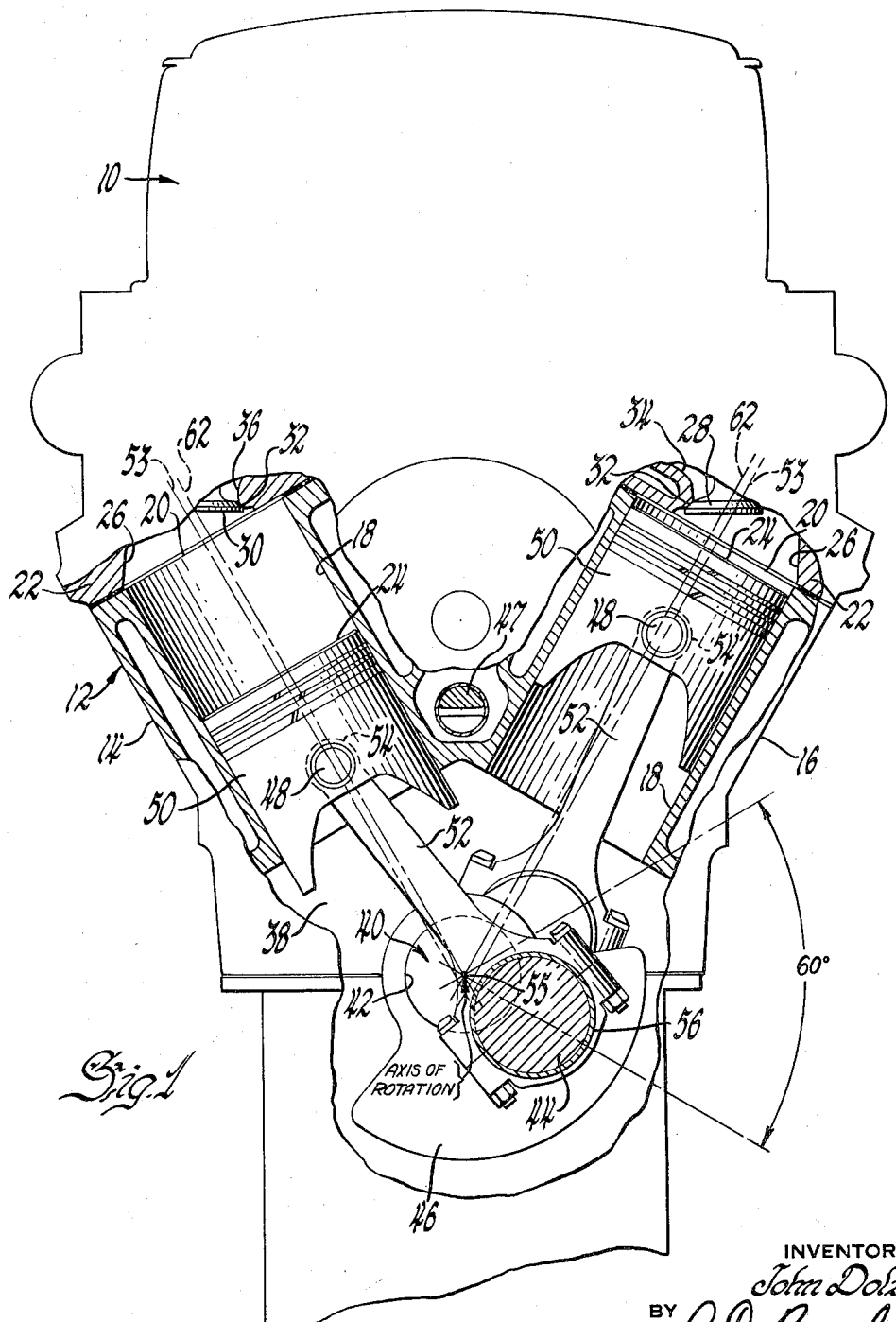
Fig. 1 is an end view with portions thereof being broken away of an engine embodying the present invention.

Referring to the drawings in more detail, this invention may be embodied in any suitable engine 10. In the present instance, the engine 10 is of the so-called V-type having a cylinder block 12 with a pair of angularly disposed banks 14 and 16 of cylinders 18. The cylinders 18 in each bank may extend through the block 12 to form sets of aligned openings in the angularly disposed faces 20 that extend along the upper sides of the block 12.

A cylinder head 22 may seat on each of these faces 20 and be secured to the cylinder block 12. A plurality of depressions may be formed in the heads 22 to register with the open ends of the cylinders 18 and cooperate with the piston 24 in forming a combustion chamber 26. Intake and exhaust valves 28 and 30, respectively, may be disposed in valve seats 32 formed in the surfaces of the depression. These valves may be actuated by any suitable means for controlling the flow of gases through the intake and exhaust passages 34 and 36, respectively, into and out of the combustion chamber.

A crankcase 38 may be provided in the space below the two banks of cylinders 18 for housing a crankshaft 40 having a plurality of main bearings 42. These bearings 42 support the crankshaft 40 for rotation about the axis 55 thereof. A plurality of radial throws 44, each of which has a bearing formed thereon, may be spaced axially along the crankshaft 40. A plurality of counterweights 46 may be provided on the crankshaft 40 to balance the primary forces and/or rocking couples created during the operation of the engine 10. If desired, a secondary balance shaft 47, driven by the crankshaft 40 at twice engine speed and having eccentrically disposed weights, may also be provided for balancing out any secondary unbalanced forces produced by the engine 10.

The pistons 24 may be reciprocably disposed in the cylinders 18 with the upper surface thereon forming one wall of the combustion chamber. A wrist pin 48 may extend through the skirt 50 of the piston 24 substantially normal to the axis of the cylinder 18 and parallel to the axis of the crankshaft 40. A connecting rod 52 having a bearing 54 in the upper end may be secured to the pin 48 while the lower end may be provided with a journal 56 that is connected to one of the throws on the crankshaft 40.

Each bank 14 and 16 of cylinders 18 may have the axes 53 thereof laterally offset so they will not intersect the axis 55 of rotation of the crankshaft 40 so as to reduce the effects of piston slap or for any other desired reasons. Under such circumstances, as the side thrust produced by the piston reverses itself, the piston 24 will move from one side of the cylinder 18 to the other side with the minimum amount of objectionable piston slap.

If the piston 24 is symmetrical about its own axis, the center of gravity of the piston will lie on the axis of the cylinder 18. In addition, if the connecting rod 52 is secured to the piston 24 by a wrist pin that intersects the axis of the cylinder 18, the effective center of mass of the moving piston and connecting rod assembly 60 may be considered as reciprocating along the axis of the cylinder 18. Thus under such circumstances when the cylinders 18 are offset and the axes thereof do not intersect the axis of rotation of the crankshaft 40, the effective center of mass of a usual reciprocating piston and connecting rod assembly 60 will be traveling along a line such as 53 that does not intersect the axis of rotation of the crankshaft 40. This will produce unbalanced forces and/or rocking couples which cannot easily be balanced by means of rotating counterweights 46 located on the crankshaft 40 and revolving about the axis thereof. Accordingly, it is now proposed to employ a piston and connecting rod assembly 60 in which the center of mass of the assembly 60 is positioned to reciprocate on an axis 62 parallel to the axis 53 of the cylinder 18 but offset therefrom to intersect the axis 55 of the crankshaft 40.

In the first embodiment, the upper end of the piston 24 has any desired surface for the combustion chamber. A substantially cylindrical ring belt 64 and a cylindrical skirt 50 may extend downwardly from this end. The wrist pin 48 which extends through the skirt 50 may have the axis 65 thereof substantially normal to the axis 53 of the piston 24 and positioned to intersect it. It is apparent that if this assembly is placed in a cylinder offset so the axis 53 thereof does not intersect the axis 55 of the crankshaft 40, the reciprocating center of mass will not act through the axis 55 of rotation. Under such circumstances an eccentrically disposed weight 66 may be provided on the interior of the piston 24. In the present instance, the weight 66 is formed on the interior of the piston 24 inside of the ring belt 64. This weight 66 is preferably of such size and magnitude that when the connecting rod 52 is attached to the piston 24 and the resultant assembly 60 is reciprocating in the cylinder 18, the effective center of mass thereof will be disposed on an axis 62 which is parallel to the axis 53 of the cylinder but is offset therefrom so as to intersect the axis 55 of rotation of the crankshaft 40. Thus all of the forces produced by movement of the moving assembly 60 will be rotary forces about the axis 55 of the crankshaft 40 and reciprocating forces that act through the center 55 of the crankshaft 40. It will thus be possible to substantially balance all of these forces by means of counterweights 46 rotating with the crankshaft.

Figure 2:
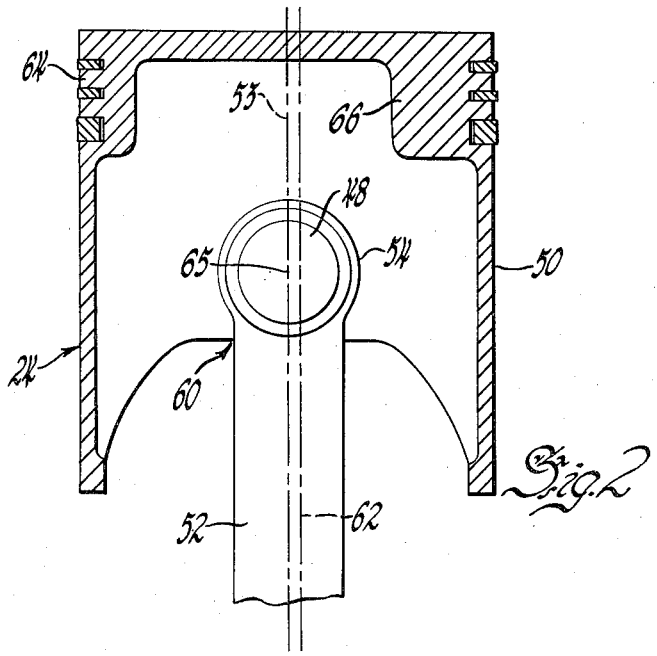
Fig. 2 is a cross sectional view of a portion of a piston and connecting rod assembly embodying the present invention and adapted for installation in the engine of Fig. 1.
Figure 3:
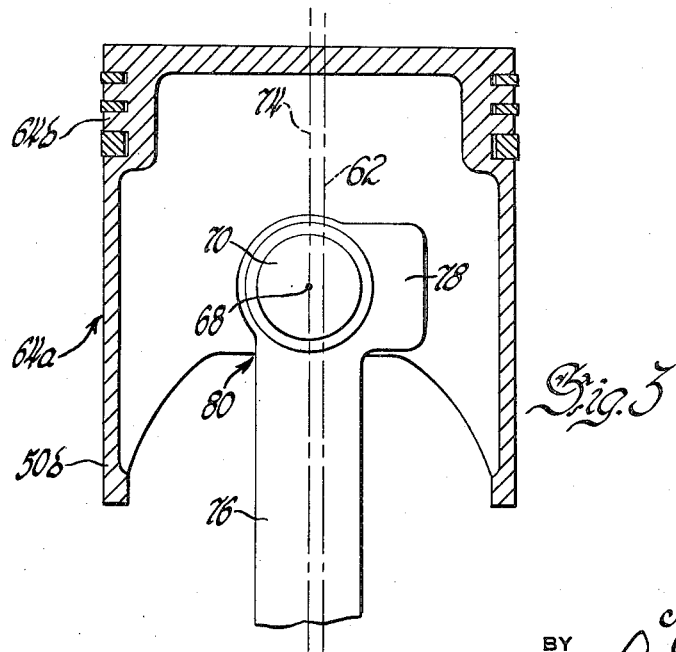
Fig. 3 is a cross sectional view of a portion of a piston and connecting rod assembly embodying a modification of the present invention.

In the embodiment shown in Fig. 4 the piston 69 may have the same general construction as that in Fig. 2, i.e., planar upper surface 71 and a skirt 73 with a ring belt 75 on the upper end thereof. The wrist pin 73a may extend through the piston 69 so as to intersect the axis 73b of the piston 69. However, instead of employing an eccentrically disposed mass inside of the ring belt, the interior of the skirt 73 may be increased in thickness on one side thereof. Thus, if this assembly is employed in a cylinder whose axis 53 is offset so that it does not intersect the axis 43 of the crankshaft 40, the center of mass of the piston 69 and connecting rod 73c assembly may be located on an axis extending through the axis of rotation of the crankshaft 40.

In the next embodiment the piston 64a is similar to the first piston 24 in that it has a plane surface on the end and a substantially cylindrical ring belt 64b and skirt 50b. The wrist pin 70 may extend through the skirt 50b so that the axis 68 thereof will intersect the axis 53 of the cylinder 18 and be parallel to the crankshaft axis 55. This normally will result in the effective center of mass of the piston and connecting rod assembly 80 reciprocating on the axis 53 which does not intersect the axis 55 of the crankshaft 40. If it is desired to retain the center of gravity of the piston 64a in a predetermined relation to the axis 68 of the wrist pin 70, it may not be feasible to place an eccentric weight on the interior of the piston 64a. Accordingly, the upper end of the connecting rod 76 may be provided with an eccentrically disposed mass 78. In the present instance this mass 78 is in the form of a weight which projects from one side of the upper end of rod 76. This weight preferably is so disposed and of such magnitude that it will cause the effective center of mass of the piston and connecting rod assembly 80 to be located on the axis 62 which intersects axis 55. Thus this will cause all of the forces to act through the axis 55 of the crankshaft 40. This is shown diagrammatically in Fig. 5.

As a further modification of the present invention reference may be had to Fig. 6 wherein cylinder 18 is positioned so that the axis 53 thereof will intersect the axis 55 of the crankshaft 40. If this is done the wrist pin axis 82 may be laterally offset so that it will not intersect the axis 53 of the cylinder 18 or the piston 84. This will greatly diminish the effects of piston slap. However, at the same time, it will offset the center of mass of the piston and connecting rod assembly 86 so that it will normally move along an axis which does not intersect the axis 55 of rotation of the crankshaft. Accordingly, a weight 88 may be provided on the interior of the piston 84 so as to move the center of mass of the assembly 86 laterally so that it will move along the axis 53 which intersects the axis 55.

As a further modification reference may be had to Fig. 7 wherein the cylinder 18 is positioned so that the axis 53 thereof intersects the axis 55 of the crankshaft 40. The wrist pin 90 may be extended through the piston 92 so that the axis 94 thereof will be parallel to the axis 55 but will not intersect the axis 53 of the cylinder 18 or piston 92. Since the center of mass of this piston and connecting rod assembly 96 will normally move on an axis not intersecting the axis 55, an eccentric weight 98 may be provided on the upper end of the connecting rod 100. This weight is preferably of such magnitude and position as to insure the center of mass of the reciprocating assembly 96 moving along the axis 53 which intersects the axis of rotation 55.

Although only four embodiments have been shown it should be understood that there are numerous variations that may be made without departing from the invention. It is apparent that an eccentrically disposed weight may be positioned in any desired location suitable for retaining the reciprocating center of mass on an axis which intersects the axis of rotation of the crankshaft. Since these and numerous other modifications are very readily apparent it is intended that the scope of the present invention is not to be limited by the foregoing descriptive material but only by the claims which follow.

What is claimed is:

1. In an engine having a rotating crankshaft and a cylinder with the axis thereof laterally offset so that said axis of said cylinder does not intersect the axis of rotation of said crankshaft, the combination of a piston reciprocably disposed in said cylinder, a connecting rod having one end thereof secured to said piston with the other end thereof secured to said crankshaft, a counter balance weight reciprocating with said piston and said connecting rod, said weight being of such magnitude and position that the effective reciprocating center of mass of said piston and connecting rod reciprocates along an axis extending through the axis of rotation of the crankshaft.

2. The combination of claim 1 wherein said counter balance weight comprises a mass eccentrically disposed on the interior of said piston.

3. The combination of claim 2 wherein said counter balance weight comprises a mass disposed on the end of the connecting rod adjacent said piston.

4. In an engine having a rotating crankshaft and a cylinder, the combination of a piston reciprocably disposed in said cylinder, a wrist pin extending through said piston, the axis of said pin being substantially parallel to the axis of rotation of said crankshaft but laterally offset from the axis of said cylinder and piston, a connecting rod having one end thereof secured to said wrist pin and the other end thereof secured to said crankshaft, a counter balance weight reciprocating with said piston and said connecting rod, said weight being of such magnitude and position that the effective reciprocating center of mass of said piston and connecting rod reciprocates along an axis extending through the axis of rotation of said crankshaft.

5. The combination of claim 4 wherein said counter balance weight comprises a mass eccentrically disposed on the interior of said piston.

6. The combination of claim 4 wherein said counter balance weight comprises a mass eccentrically disposed on the end of said connecting rod adjacent said piston.

7. An engine having at least one cylinder, a piston reciprocably disposed in said cylinder, a rotating crankshaft, a connecting rod having a reciprocating end attached to said piston and a rotating end attached to said crankshaft, the point of attachment of said reciprocating end to said piston reciprocating on a line skew to the axis of rotation of said crankshaft, a counter balance weight positioned to reciprocate with said piston and said reciprocating end, said weight being of such magnitude and position that the effective reciprocating center of mass of said piston and said rod travels on an axis intersecting the axis of rotation of said crankshaft.

8. The engine of claim 7 wherein said counter balance weight is formed on the interior of said piston so as to reciprocate therewith.

9. The engine of claim 7 wherein said counter balance weight is mounted on said reciprocating end of said connecting rod so as to reciprocate therewith.

10. A connecting rod having a bearing on one end thereof for attachment to a throw on a crankshaft so as to rotate therewith and a bearing on the opposite end for attachment to a piston wrist pin which does not travel on a line intersecting the axis of rotation of said crankshaft, an eccentrically disposed counter balance weight on said reciprocating end adjacent said piston, said weight being of such magnitude and position that the effective center of mass of said piston and connecting rod will reciprocate along a line intersecting the axis of rotation of said crankshaft.

11. A piston adapted to be reciprocably disposed in a cylinder and coupled to a rotating crankshaft by means of a connecting rod having one end attached to said piston and the other end attached to said crankshaft so that said first end of said rod reciprocates on an axis skew to the axis of said crankshaft, said piston including a counter balance weight, said weight being disposed inside of said piston and being of such magnitude and position that when said connecting rod is secured to said piston and disposed in said cylinder the resultant reciprocating center of mass of said piston and said rod will reciprocate on an axis extending through the axis of rotation of said crankshaft.

12. An engine having at least one cylinder, a piston reciprocably disposed in said cylinder, a rotating crankshaft, a wrist pin in said piston, a connecting rod having a reciprocating end attached to said wrist pin and a rotating end attached to said crankshaft, the axis of said wrist pin being substantially parallel to the axis of said crankshaft and reciprocating in a plane outside of the axis of rotation of said crankshaft, the effective reciprocating center of mass of said piston and connecting rod assembly being disposed to move along a line which is within a plane containing the axis of rotation of said crankshaft.

References Cited in the file of this patent

UNITED STATES PATENTS

| | | |
|---|---|---|
| Re. 14,292 | Fekete | Apr. 24, 1917 |
| Re. 21,177 | Barkeij | Aug. 22, 1939 |
| 83,188 | Mansfield | Oct. 20, 1868 |
| 364,627 | Arnold | June 14, 1887 |
| 613,769 | Lanchester | Nov. 8, 1898 |
| 1,007,842 | Belknap et al. | Nov. 7, 1911 |
| 1,138,892 | Roberts | May 11, 1915 |
| 1,144,514 | Waldon | June 29, 1915 |
| 1,330,602 | Moss | Feb. 10, 1920 |
| 1,355,468 | Goodrich | Oct. 12, 1920 |
| 1,425,630 | Brown | Aug. 15, 1922 |
| 1,545,930 | Vincent | July 14, 1925 |
| 1,602,797 | Knight | Oct. 12, 1926 |
| 1,680,917 | Sloan et al. | Aug. 14, 1928 |
| 1,701,322 | Edwards | Feb. 5, 1929 |
| 1,777,478 | Schaeffers | Oct. 7, 1930 |
| 2,097,983 | Kratky | Nov. 2, 1937 |

FOREIGN PATENTS

| | | |
|---|---|---|
| 11,340 of 1905 | Great Britain | Jan. 25, 1906 |
| 22,760 of 1912 | Great Britain | June 5, 1913 |
| 154,824 | Great Britain | Dec. 9, 1920 |

OTHER REFERENCES

Heldt: "Effects of Piston Pin Offset," Automotive Industries, vol. 108, No. 5, pages 28–31, 73, Mar. 1, 1953.